G. E. STACK.
MOTOR CONTROL SYSTEM.
APPLICATION FILED JULY 31, 1912.
1,126,311.
Patented Jan. 26, 1915.
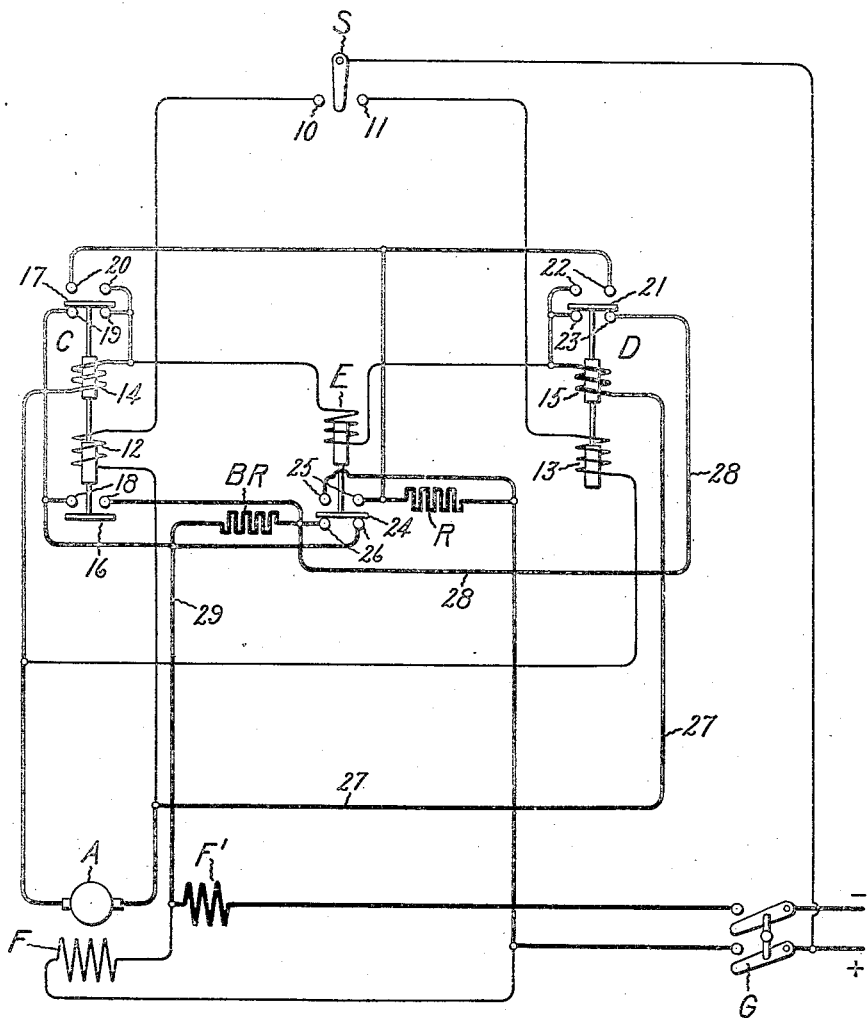
WITNESSES:
J. Earl Ryan
J. Ellis Glen
INVENTOR:
GEORGE E. STACK,
BY Albert G. Davis
HIS ATTORNEY.

UNITED STATES PATENT OFFICE.

GEORGE E. STACK, OF SCHENECTADY, NEW YORK, ASSIGNOR TO GENERAL ELECTRIC COMPANY, A CORPORATION OF NEW YORK.

MOTOR-CONTROL SYSTEM.

1,126,311.  Specification of Letters Patent.  Patented Jan. 26, 1915.

Application filed July 31, 1912. Serial No. 712,385.

*To all whom it may concern:*

Be it known that I, GEORGE E. STACK, a citizen of the United States, residing at Schenectady, in the county of Schenectady, State of New York, have invented certain new and useful Improvements in Motor-Control Systems, of which the following is a specification.

This invention relates to the control of electric motors and has for its object the provision of means whereby an electric motor may be started, stopped and generally controlled in a reliable, simple and efficient manner.

My invention relates more specifically to the control of motors which are brought to rest by dynamically braking the motor.

In the control of electric motors it is common to retard the motor armature by causing it to generate current through a resistance. Sometimes this is accomplished by leaving the armature connected to the supply circuit and causing it to restore energy to the line. More frequently the armature is disconnected from the line and connected to a braking resistance so that the armature will generate current through the resistance. With either method of braking it has been found desirable to increase the dynamic braking current so as to increase the braking torque as the armature slows down during braking. If the resistance in circuit is constant, the current will decrease and consequently the torque tending to stop the motor. If the braking current is high enough to be effective after the motor has slowed down, it will be too high during the initial braking period and cause sparking at the commutator and other troubles. By decreasing the resistance as the motor slows down, the torque may be increased so as to bring the motor to rest more quickly and without injury to the motor and other apparatus due to excessive current flow. One method which has been suggested is to control the dynamic braking current by a relay which depends for its action upon the field strength of the motor.

In carrying out my invention I provide means whereby the dynamic braking current will be controlled by the same means which controls the starting resistance. In one embodiment of my invention, I provide a counter electromotive force relay for controlling the starting resistance and cause this same relay to control the dynamic braking current. The arrangement is such that as the motor speeds up the relay will be lifted to short circuit the starting resistance and after the dynamic brake has been applied and the motor armature has slowed down to a predetermined speed, the relay will drop to short circuit the braking resistance as a whole or in part.

My invention is particularly applicable to reversible electric motors for use on machine tools in which the motor is to be periodically reversed, as for instance in planers, nut tappers, and the like, although it is equally applicable to reversible motors for other purposes, as well as to non-reversible motors.

Other objects and purposes of my invention will appear in the course of the following specification in which I have shown my invention embodied in concrete form for purposes of illustration.

In the accompanying drawing illustrating one form of my invention, A represents the armature and F the shunt field of an electric motor to be controlled.

R represents the starting resistance for the motor and C and D represent two electromagnetic switches, one for closing the motor circuit through the resistance R for each direction of rotation. A master switch S controls these two reversing electromagnetic switches so that when the switch S is moved into engagement with contact 10 the switch C will be closed to start the motor through the resistance R and when it moves into engagement with contact 11 the switch D will close to start the motor through the resistance R in the opposite direction. The switches C and D have operating windings 12 and 13 respectively for moving the switches to closed position, these windings being connected in shunt to the motor. In addition to these windings the switches are provided with series windings 14 and 15 for holding the switches in operative position, as hereinafter described. The switch C is provided with two switch contacts 16 and 17, the former for bridging the contacts 18 when the switch is in the closed position while the latter operates to bridge the contacts 19 in open position and bridge the contacts 20 in closed position. The switch D has only one switch contact 21 operating between contacts 22 and 23.

BR represents a braking resistance which is adapted to be connected in short circuit with the motor armature to retard the motor when both the switches C and D are in their open position.

E represents a relay which I have shown as a counter electromotive force relay for controlling the motor circuit. This relay performs two functions. During the starting of the motor this relay lifts its contact 24 into engagement with the contacts 25 so as to short circuit the resistance R when the motor reaches a predetermined speed. The relay also acts to control the dynamic braking current. The arrangement is such that when the two switches C and D are open i. e. in the down position in which the motor is disconnected from the supply circuit the motor is dynamically braked by the short circuiting of the armature through the resistance BR. After the motor has slowed down to a certain extent the relay E drops so as to bridge the contacts 26, thereby short circuiting the resistance BR and increasing the braking current, thereby quickly bringing the motor to rest.

As thus constructed and arranged, the operation of my device will be as follows: Assuming that the line switch G is closed and the master switch S is moved into engagement with the contact 10, then the electromagnetic switch C will be closed, the circuit through the energizing winding 12 being as follows: from the positive side of the line, contact 10 of switch S, winding 12, conductor 27, winding 15, contacts 23, conductor 28, across the contacts 26 of the counter electromotive force relay and back to the negative side of the line through the series commutating field F'. The closure of the switch C completes the armature circuit as follows: from the positive side of the line, through resistance R, contacts 20, winding 14, armature A, conductor 27, winding 15, contacts 23, conductor 28, contacts 18 of switch C, conductor 29, back to the negative side of the line. The motor will now start with the resistance R in circuit and as the armature reaches a predetermined speed the counter electromotive force relay E will operate to short circuit the resistance R and bring the motor up to running speed. If now the switch S is moved into engagement with contact 11 to reverse the motor the switch C will immediately open. When the master switch leaves the contact 10, switch C opens and a dynamic braking circuit will be closed from the armature A, through the conductor 27, winding 15, contacts 23 on the switch D, conductor 28, brake resistance BR, contacts 19, and winding 14 of the switch C to the opposite side of the armature. It will be noted that the windings 14 and 15 of the switches C and D are energized by this dynamic braking current so as to firmly hold the switches in their open or dynamic braking position. The winding 15 prevents the switch D from closing when the master switch is moved on to contact 11, and will not permit it to close until the current in the winding 15 decreases practically to zero by the armature being brought substantially to rest. The dynamic braking action now takes place through the resistance BR and the armature is gradually slowed down. When the armature reaches a predetermined speed at which it is safe to increase the dynamic braking current, the relay E will drop so as to short circuit the resistance BR, thereby increasing the braking current and bringing the motor to rest. As soon as the armature has been brought to rest or substantially so, the energizing winding 13 will close the switch D so as to reverse the current through the motor armature. The current through the armature will now be from the positive side of the line through the resistance R, contacts 22, winding 15, conductor 27, armature A, winding 14, and contacts 19 of switch C, thence through conductor 29 to the negative side of the line. When the motor reaches a predetermined speed the counter electromotive force relay will again operate to short circuit the resistance R. When the master switch S is moved out of engagement with contact 11 the motor will be dynamically braked through the resistance BR and after the motor has been slowed down to a predetermined speed the relay will drop to short circuit the resistance BR and the motor will be brought to rest. It will be seen that by this arrangement a single relay serves to control both the starting and the braking resistance for both directions of rotation of the motor, thereby greatly simplifying the apparatus.

While I have described my invention as embodied in concrete form and as operating in a specific manner in accordance with the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The combination with an electric motor and a starting resistance therefor, of a relay controlled by the motor, and connections whereby said relay automatically operates to short circuit said resistance as the motor speeds up and dynamically brake the motor as the latter slows down.

2. The combination with an electric motor and a starting resistance therefor, of a counter electromotive force relay controlled by the motor, and connections whereby said relay automatically operates to short circuit said resistance as the motor speeds up and dynamically brake the motor as the latter slows down.

3. The combination with an electric motor and a starting resistance therefor, of a dynamic braking resistance, a relay controlled by the motor having two positions, and connections whereby said relay short circuits the starting resistance in one position and short circuits the braking resistance in the other position.

4. The combination with an electric motor and a starting resistance therefor, of a dynamic braking resistance, a relay controlled by the motor, and connections whereby said relay short circuits the starting resistance as the motor speeds up and short circuits the braking resistance as the motor slows down.

5. The combination with an electric motor and a starting resistance therefor, of a dynamic braking resistance, a counter electromotive force relay, and connections whereby said relay short circuits the starting resistance as the motor speeds up and short circuits the braking resistance as the motor slows down.

6. The combination with an electric motor, and a starting resistance thereof, of a dynamic braking resistance, a counter electromotive force relay having two positions, and connections whereby said relay short circuits the starting resistance in one position and short circuits the braking resistance in the other position.

7. The combination with an electric motor, of a starting resistance therefor, a pair of electromagnetic switches one for closing the motor circuit through said resistance for each direction of rotation, a dynamic braking resistance, connections whereby the motor armature is short circuited through said braking resistance when both of said switches are open, a counter electromotive force relay, and connections whereby said relay short circuits the starting resistance as the motor speeds up and short circuits the braking resistance as the motor slows down.

8. The combination with an electric motor, of a starting resistance thereof, reversing mechanism for closing the motor circuit through said resistance for each direction of rotation, a dynamic braking resistance, connections whereby the motor armature is short circuited through said braking resistance, a counter electromotive force relay, and connections whereby said relay short circuits the starting resistance as the motor speeds up in either direction and short circuits the braking resistance as the motor slows down.

In witness whereof, I have hereunto set my hand this 29th day of July, 1912.

GEORGE E. STACK.

Witnesses:
BENJAMIN B. HULL,
HELEN ORFORD.